US009367367B2

(12) United States Patent
Rastogi et al.

(10) Patent No.: US 9,367,367 B2
(45) Date of Patent: Jun. 14, 2016

(54) APPLICATION ROUTER

(71) Applicant: Avaya Inc., Basking Ridge, NJ (US)

(72) Inventors: Vipul Rastogi, Pune (IN); Kurt H. Haserodt, Westminster, CO (US); Joel M. Ezell, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 400 days.

(21) Appl. No.: 13/911,967

(22) Filed: Jun. 6, 2013

(65) Prior Publication Data

US 2014/0365635 A1  Dec. 11, 2014

(51) Int. Cl.
G06F 15/16 (2006.01)
G06F 9/54 (2006.01)
H04L 29/06 (2006.01)
H04L 12/26 (2006.01)
H04L 29/08 (2006.01)

(52) U.S. Cl.
CPC *G06F 9/54* (2013.01); *H04L 43/00* (2013.01); *H04L 65/1069* (2013.01); *H04L 65/1073* (2013.01); *H04L 65/1076* (2013.01); *H04L 65/1083* (2013.01); *H04L 65/80* (2013.01); *H04L 67/14* (2013.01)

(58) Field of Classification Search
CPC ........... G06F 9/542; G06F 9/54; G06Q 10/06; H04L 45/00; H04L 43/00; H04L 65/1069; H04L 65/1073; H04L 65/1076; H04L 65/1083; H04L 65/80; H04L 67/14

USPC ........................... 709/227, 228, 238; 719/318
See application file for complete search history.

(56) References Cited

U.S. PATENT DOCUMENTS 6,915,457 B1 * 7/2005 Miller ................. G06F 11/3495 370/244
8,179,889 B2   5/2012 Chan et al.
2007/0168421 A1 * 7/2007 Kalyanpur .............. H04L 45/00 709/204

OTHER PUBLICATIONS

JSR-000289 SIP Servlet 1.1. Final Release. http://download.oracle.com/otndocs/jcp/sip_servlet-1.1-fr-eval-oth-JSpec/. (1 page).
Kulkarni et al. "SIP Servlet Specification, version 1.1." JSR 289 Expert Group. 242 pgs.

* cited by examiner

*Primary Examiner* — Viet Vu
(74) *Attorney, Agent, or Firm* — Sheridan Ross P.C.

(57) ABSTRACT

A process for registering applications is disclosed. The applications typically work in a Session Initiation Protocol (SIP) JSR 289 environment. A request to register a application to monitor a communication session is received. A first instruction that identifies a first event in the communication session is received from the application. An event may be the sending of a specific type of packet, such as a SIP INVITE. The first event in the communication session is detected. In response to detecting the first event in the communication session, the application is registered to monitor the communication session according to the first instruction. A notification is also sent to the application to monitor the communication session according to the first instruction.

20 Claims, 5 Drawing Sheets

APPLICATION ROUTER

TECHNICAL FIELD

The systems and methods that relate to communication systems and in particular to communication monitoring systems.

BACKGROUND

The concept of using application routers was introduced in the Java Specification Request (JSR) 289 specification, the entire contents of which are hereby incorporated herein by reference. The application router is responsible for application composition. Within this context, application composition is the process of chaining multiple applications together in a logical sequence. When multiple applications are chained together, the chained application processes a given Session Initiation Protocol (SIP) message and once it is done processing, the chained application passes the SIP message to the next application in the chain.

JSR 289 states that it is the role of the developer to define the application composition by providing an application router implementation. Currently under JSR 289, the application router implementation is specific to the applications in the chain. Today, there is not a standard way to dynamically deploy multiple applications and have the application router know when to invoke a chained application on receipt of a SIP request. The result is that the code to the application router must be modified or upgraded as new applications are added to the chain. This can result in slow adaptation to new applications and unnecessary work in recoding/upgrading the application router as new applications become available. What is needed is a way to dynamically deploy new applications without having to update or modify the application router.

SUMMARY

Systems and methods are provided to solve these and other problems and disadvantages of the prior art. A process for registering applications is disclosed. The applications, in some embodiments, work in a Session Initiation Protocol (SIP) JSR 289 environment. A request to register an application to monitor a communication session is received. A first instruction that identifies a first event in the communication session is received from the application. An event may be the sending of a specific type of packet, such as a SIP INVITE. The first event in the communication session is detected. In response to detecting the first event in the communication session, the application is registered to monitor the communication session according to the first instruction. A notification is also sent to the application to monitor the communication session according to the first instruction.

DETAILED DESCRIPTION

Figure 1:
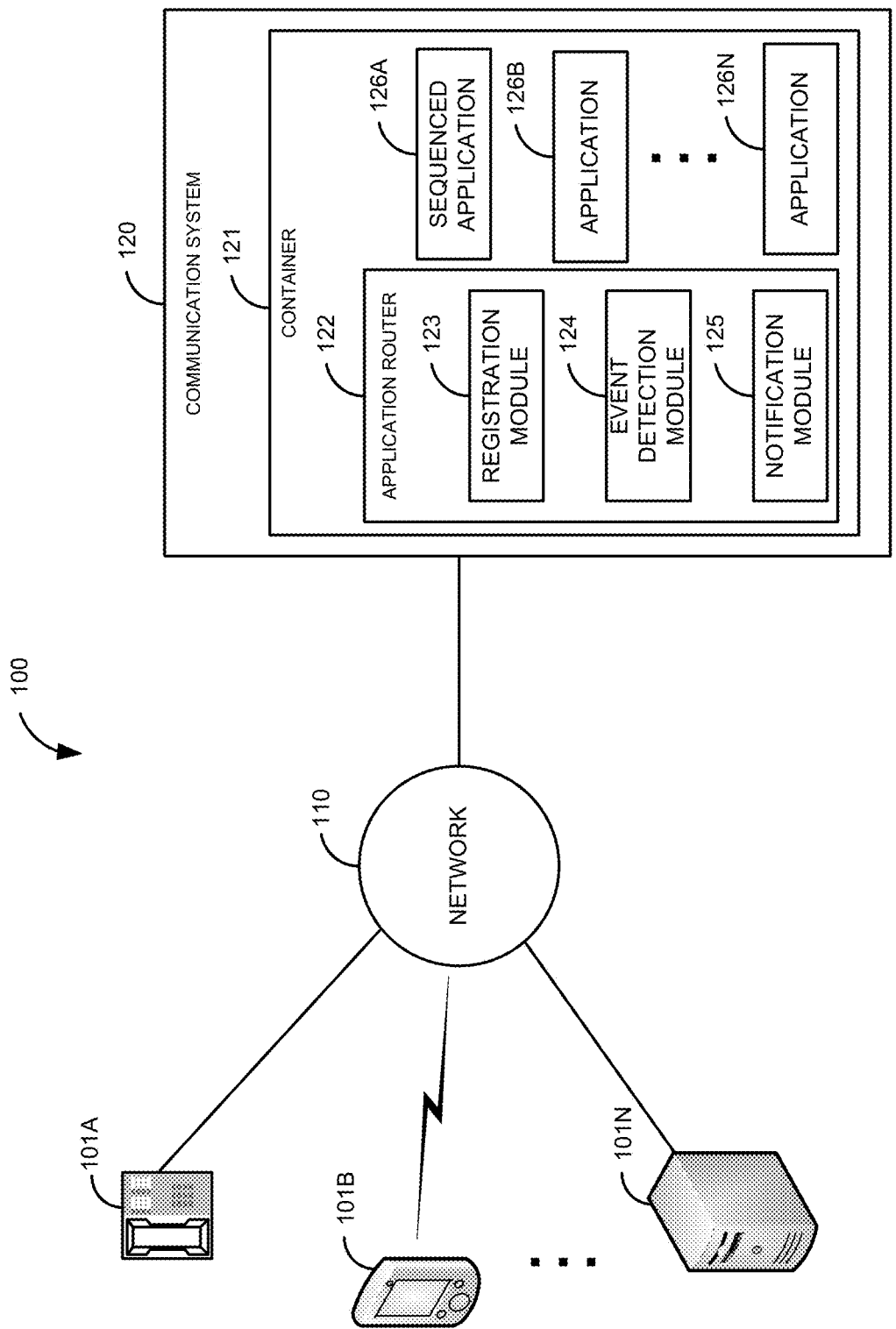
FIG. 1 is a block diagram of a first illustrative system for registering applications.

FIG. 1 is a block diagram of a first illustrative system 100 for registering applications. The first illustrative system 100 comprises communication devices 101A-101N, a network 110, and a communication system 120.

The communication device 101 may be any device that can communicate on the network 110, such as a Personal Computer (PC), a telephone, a video system, a cellular telephone, a Personal Digital Assistant (PDA), a tablet device, a notebook device, a video server, a Private Branch Exchange (PBX), a proxy server, a voice/video conference bridge, a central office switch, an Instant Messaging System, and the like. As shown in FIG. 1, any number of communication devices 101A-101N may be connected to network 110, including only a single communication device 101. In addition, the communication device 101 may be directly connected to the communication system 120.

The network 110 can be any network that can send and receive information, such as the Internet, a Wide Area Network (WAN), a Local Area Network (LAN), the Public Switched Telephone Network (PSTN), a packet switched network, a circuit switched network, a cellular network, a combination of these, and the like. The network 110 can use a variety of protocols, such as Ethernet, Internet Protocol (IP), Session Initiation Protocol (SIP), Integrated Services Digital Network (ISDN), and the like.

The communication system 120 can be any hardware/software that can handle communications from the communication devices 101A-101N, such as a Private Branch Exchange (PBX), a communication manager, a conference bridge, a video router, a central office switch, a proxy server, a gateway, and/or the like. The communication system 120 further comprises a container 121. The container 121 can be any hardware/software that can process communications, such as a JSR 289 container, an operating system, an application running on an operating system, a threaded process running on an operating system, and/or the like.

The container 121 further comprises an application router 122 and applications 126A-126N. The application router 122 can be any process that processes applications within the communication system 120. The application router 122 further comprises a registration module 123, an event detection module 124, and a notification module 125. The registration module 123 can be any process that can register one or more applications 126. The event detection module 124 can be any process that can detect events in a communication session. The notification module 125 can be any process that can send a notification to the applications 126A-126N.

The applications 126A-126N can be any application that can monitor or influence a communication session. For example, an application 126 can be a call recording application, a 911 application, an application to monitor a call to or from a specific telephone number, a call center application, a voice mail application, an email application, an Instant Messaging (IM) application, a call forwarding application, a sequenced application, and/or the like.

The communication system 120 can set up various types of communications between communication devices 101A-101N. For example a communication session may be a Session Initiation Protocol (SIP) voice call between communication devices 101A and 101B. Alternatively, the communication session can be for a video stream from the communication device 101N (e.g., a video server) to the communication device 101B using a video protocol. The communication session may be a communication session between the communication device 101A and the communication system 120. The communication session can be any type of communication session, such as a voice session, a video session, an email session, a text session, an Instant Messaging session, a conference session, a combination of these, and the like. The communication session may use a variety of protocols, such as SIP, H.323, Integrated Digital Services Network (ISDN), Plain Old Telephone Service (POTS), video protocols, text protocols, email protocols, Instant Messaging protocols, and/or the like. A communication session can start upon the receipt of a message that indicates the start of a communication session, such as the sending of an initial SIP INVITE message. The communication session may end based on an ending message, such as a SIP BYE or an acknowledgement message. A communication session can include instances where a SIP SUBSCRIBE, a SIP NOTIFY, a SIP PUBLISH message, and/or any initial SIP transaction (i.e., a request/response exchange) of any dialog that is sent from or to an external or internal entity are used. The entity may be looking to gain information about the communication session.

The application router 122 is used to register the applications 126A-126N to monitor the media and/or control signaling of a communication session. For example, a recording sequenced application 126 can register to monitor a communication session between the communication devices 101A and 101B. When the recording sequenced application 126 is registered, the recording sequenced application 126 is inserted into the communication stream (e.g., media in the form of voice, video, etc.) between the communication device 101A and 101B so that the communication can be recorded by the recording sequenced application 126.

The application 126A sends a request to register the application 126A. The request is to monitor and/or influence a communication session. A communication session can be monitored in various ways. For example, a communication session can be monitored for specific types of packets, such as, packets of a Real Time Protocol (RTP) stream, SIP INVITE messages, packets from a specific address, packets to a specific address, packets of a conference call to a particular conferencing server, and/or the like. A session may be monitored by getting information about the communication session, by monitoring all packets in the communication session, by monitoring a portion of packets in a communication session, and/or the like. A communication session can be influenced with in various ways, such as inserting an Interactive Voice Response (IVR) system into a communication session, forwarding a call, transferring a call, sending a call to voice or video mail, initiating a call based on a call center agent ending a call, forwarding an email, transferring an Instant Message session, and/or the like In addition to the application 126 sending the request to register the application 126A, the request to register the application 126A can come from another source, such as, from the communication system 120, based on an administrator configuring the communication system 120, from another application (e.g., application 126N), based on a time of day, based on an event, based on a change of status of a user, and/or the like.

The registration module 123 receives the request to register the application 126A. If the request to register the application 126A is from the application 126A, the request may also contain instruction(s) from the application 126A that identifies an event in the communication session. Alternatively, the application 126A can send the instruction(s) in a separate message or based on a request from registration module 123 for the instruction(s). If the request is from another source, the registration module 123 can request the instruction(s) from the application 126A.

The instruction that identifies an event in a communication session can be for any type of event, such as the initiation of a SIP INVITE to start a communication session, based on sending an RTP packet, based on a request to transfer a call, based on a request to forward a call, based on a off hook signal, based on a SIP BYE message, based on receiving a call from a specific number, based on calling a specific number, based on receiving a command from a user, based on content in a packet payload or header, and/or the like. The instruction may be for a specific event or a sequence of events that have to occur in a specific order. For example, the sequence of events may require that a SIP INVITE be received from the communication device 101A and the receipt of a first RTP packet to communication device 101A before the event is triggered. Alternatively, the sequence of events may just have to occur in the communication session (regardless of order). In another embodiment, the sequence of events may be for a number of events to occur. For example, the instructions may define five events, but only three of the five events have to occur.

The instruction that identifies the event can be based on a phase of the communication session. The instruction can be to register the application 126 based on detecting one or more events that constitute a phase of the communication. The phase of the communication may be based on a number of specific packets received. For example, the first 10 packets constitute the beginning phase of a communication session; the next 20 packets of a specific type constitute the middle of the communication session; the end phase of the communication session may be based on a specific message or group of messages.

The event detection module 124 detects the event in the communication session. In response to detecting the event in the communication session, the registration module 123 registers the application 126A to monitor and/or influence the communication session according to the instruction. The notification module 125 sends a notification to the application 126A to monitor/influence the communication session according to the instruction. The application 126A is then inserted into the communication session and monitors/influences the communication session according to the instruction.

To illustrate, consider the following example. The application 126A is a collaboration application that can forward a call initially directed to a user's office phone based the user's presence information. The application 126A sends a request to the registration module 123 to register the application 126A to monitor a communication session. The request to register the application 126A also includes an instruction that identifies an event. The event is to detect any incoming calls to the user's office phone.

The event detection module 124 monitors for any incoming calls to the user's office phone. Upon detection of an incoming call (e.g., a SIP INVITE) to the user's office telephone, the registration module 123 registers the application 126A to monitor the communication session. Packets for the communication session are now routed to the application 126A (including the SIP INVITE) and monitored by the application 126A. Upon receipt of the SIP INVITE, the application 126A gets the user's presence information. For example, the sequenced application 126A detects, from a calendar event, that the user is not in his office, but is in Jane Doe's office. Based on the presence information from the calendar, the application 126A forwards (i.e., influences) the call to the user's cell phone or to Jane Doe's office phone instead of sending the call to the user's office phone.

Alternatively, if the application 126A detected that the user is at his desk (e.g., based on the user typing on his keyboard), the call would not be forwarded. Instead, the call would be routed to the user's office phone.

The above process can be repeated for any number of applications 126. For example, application 126B and application 126N can register using the same process described above. In this example, there are three applications 126A, 126B, and 126N. The applications 126, based on the instructions, may monitor the same communication session or different communication sessions. The instructions for the applications 126A, 126B, and 126N can define the same event and/or different events.

Figure 2:
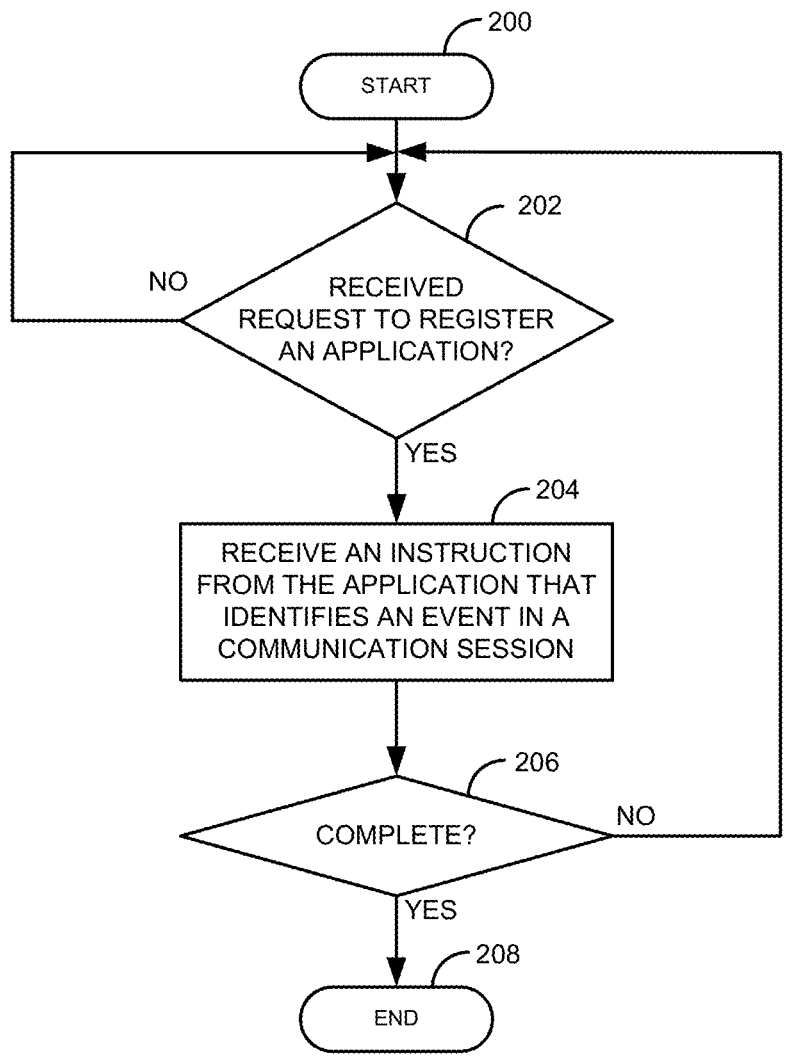
FIG. 2 is a flow diagram of a method for receiving requests to register a application.

FIG. 2 is a flow diagram of a method for receiving requests to register an application. Illustratively, the communication devices 101A-101N, the communication system 120, the container 121, the application router 122, the registration module 123, the event detection module 124, the notification module 125, and the applications 126A-126N are stored-program-controlled entities, such as a computer or processor, which performs the method of FIGS. 2-5 and the processes described herein by executing program instructions stored in a tangible computer readable storage medium, such as a memory or disk. Although the methods described in FIGS. 2-5 are shown in a specific order, one of skill in the art would recognize that the steps in FIGS. 2-5 may be implemented in different orders and/or be implemented in a multi-threaded environment. Moreover, various steps may be omitted or added based on implementation.

The process depicted in FIG. 2 starts in step 200. The process determines in step 202 if a request to register a application to monitor a communication session for a media and/or control signaling has been received. If a request to register the application has not been received in step 202, the process repeats step 202.

Otherwise, if the process receives a request to register the application in step 202, the process receives 204 an instruction(s) from the application that identifies an event(s) in a communication session. The process determines in step 206 if the process is complete. If the process is not complete in step 206, the process goes to step 202. Otherwise, if the process is complete in step 206, the process ends in step 208.

Figure 3:
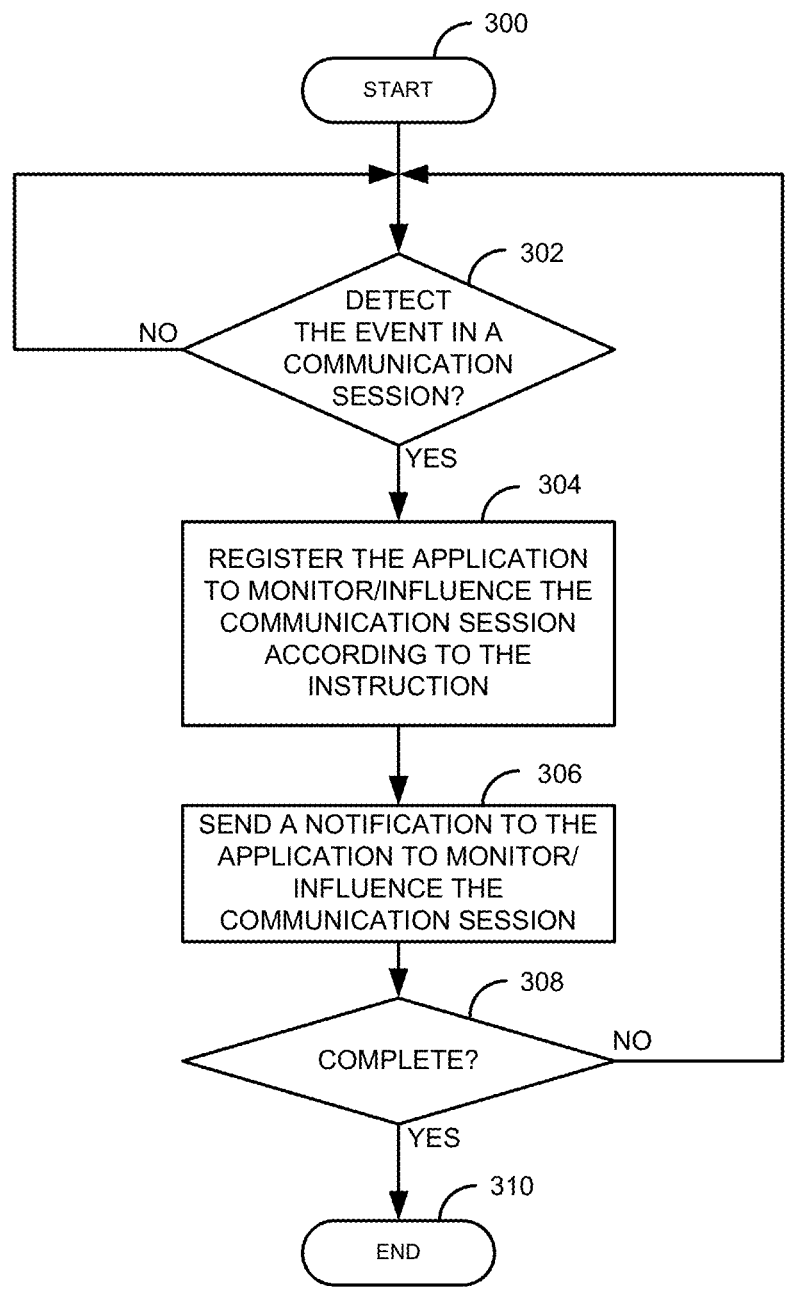
FIG. 3 is a flow diagram of a method for registering applications.

FIG. 3 is a flow diagram of a method for registering applications. The process starts in step 300. The process waits to detect the event in the communication session (defined in the instructions received in step 204 of FIG. 2) in step 302. If the event is not detected in the communication session in step 302, the process repeats step 302.

Otherwise, if the process detects the event in the communication session in step 302, the process registers 304 the application to monitor/influence the communication session according to the instruction. The process sends 306 a notification to the application to monitor/interact with the communication session according to the instruction. The process determines in step 308 if the process is complete. If the process is not complete in step 308, the process goes to step 302. Otherwise, if the process is complete in step 308, the process ends 310.

Figure 4:
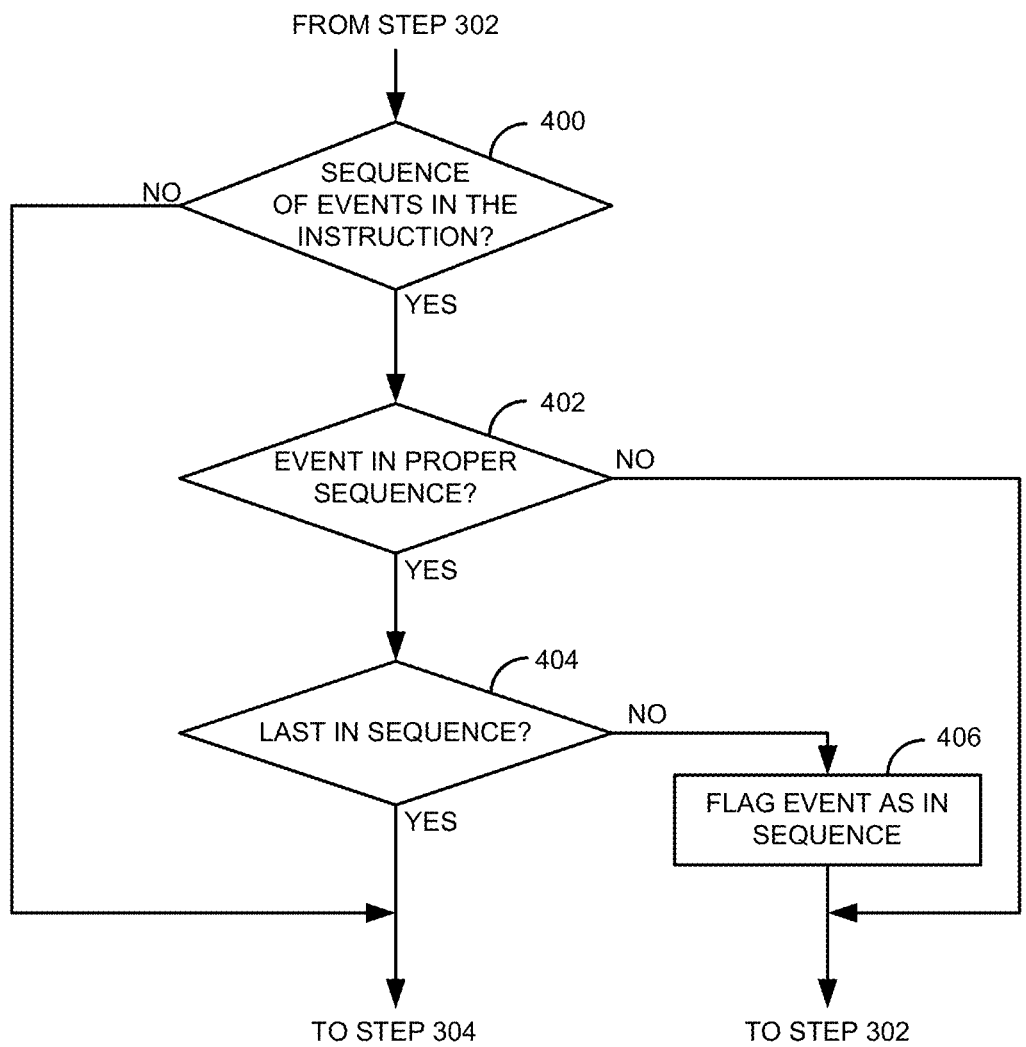
FIG. 4 is a flow diagram of a method for handling a sequence of events.

FIG. 4 is a flow diagram of a method for handling a sequence of events. The process described in FIG. 4 is a process that can optionally operate in conjunction with the process of FIG. 3. The process in FIG. 4 can be inserted between steps 302 and 304 of FIG. 3.

After detecting the event in the communication session in step 302, the process determines, in step 400, if the instruction identifies a sequence of events. If the instruction does not identify a sequence of events in step 400, the process goes to step 304.

Otherwise, if the process determines that the instruction identifies a sequence of events in step 400, the process determines in step 402 if the event is in proper sequence. For example, if the event has to occur after another event, the process determines in step 402 if the other event has already occurred. If the event is not in proper sequence in step 402, the process goes to step 302. Otherwise, if the event is in proper sequence in step 402, the process determines in step 404 if the event is the last event in the sequence. If the event is not the last event in the sequence in step 404, the process flags 406 the event as in sequence and goes to step 302. Otherwise, if the event is the last is the last event in the sequence, the process goes to step 304.

The sequence of events can be events of different communication sessions or based on a combination of events in different communication sessions. To illustrate, consider the following example. In this example, the instructions indicate a sequence of events that comprises a first event that detects of the sending of a SIP ACK (that indicates that the communication session has started) for a voice call (a first communication session) and a second event that detects a request to do an Instant Message chat session (a second communication session). Alternatively, the indication that the session has started may be based in the sending of a SIP INVITE.

When the voice call is initiated and the SIP ACK is sent, the process detects in step 302 the SIP ACK event according to the instructions. The process determines in step 400 that that there is a sequence of events (a sequence of two events). The process determines in step 402 if the SIP ACK event is in proper sequence. The SIP ACK event is in proper sequence because it is the first event in the sequence of events. The process determines if the SIP ACK event is the last event in the sequence in step 404. Since the SIP ACK event is not the last event in the sequence, the process flags the SIP ACK event as in sequence in step 406 and goes to step 302.

The process detects the request to do an Instant Message session in step 302. The process determines in step 400 that there is a sequence of events. The process determines in step 402 that the Instant Message session request event is in the proper sequence. The process determines in step 404 if the request to do an Instant Message session event is the last event in the sequence of events. Since the event to do an Instant Message session is the last event in the sequence, the process goes to step 304 and registers the application to monitor/influence the communication session according to the instructions. A notification is sent to the application to monitor/influence the communication session. The application sees the request to do an Instant Message session. Based on this, the application, notifies the user that he/she has received a request to do an Instant Message session via a whisper mode during the voice call or via a popup on the user's telephone.

Figure 5:
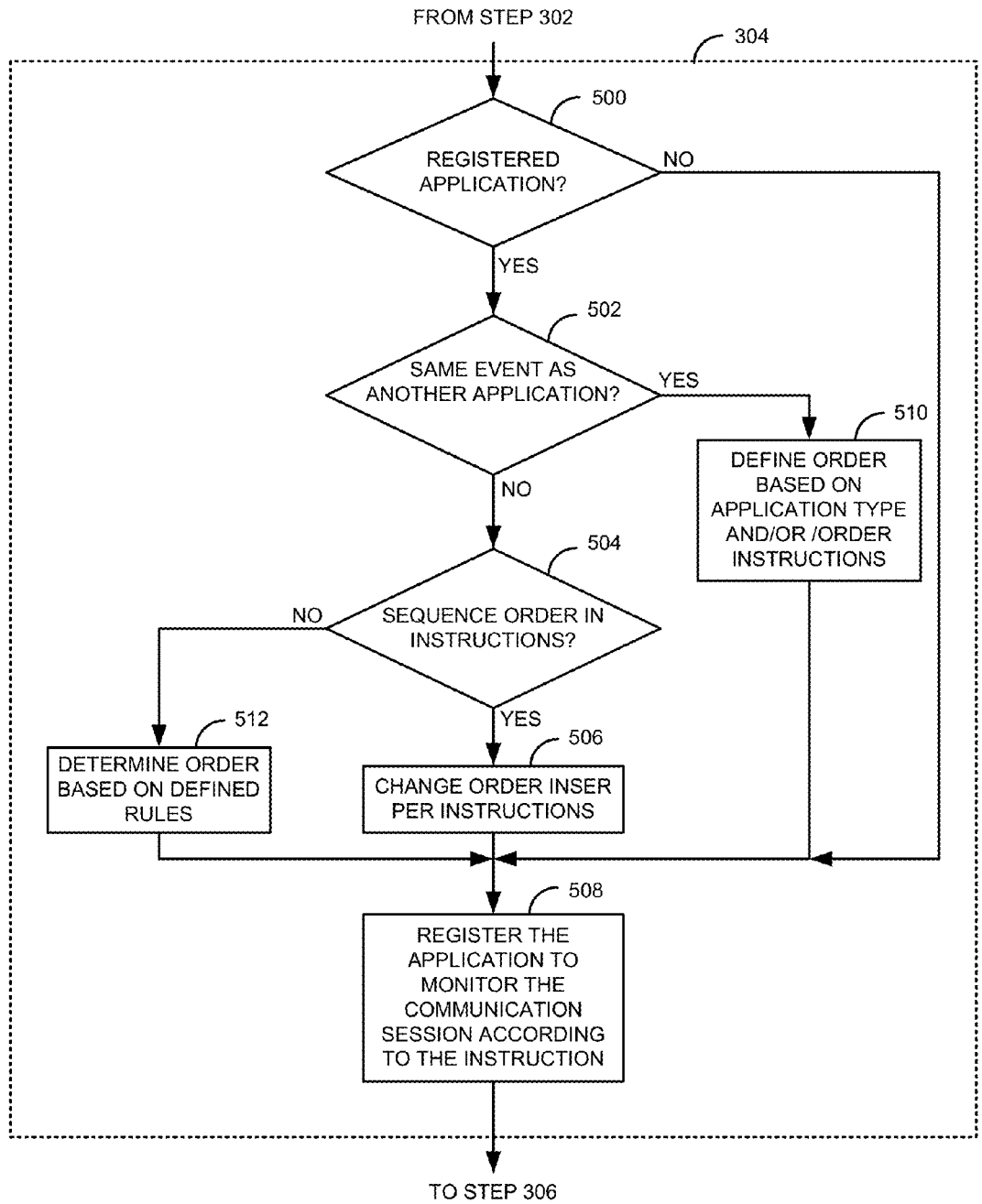
FIG. 5 is a flow diagram of a method for determining a sequence for applications.

FIG. 5 is a flow diagram of a method for determining a sequence for applications. The process described in FIG. 5 is an exemplary implementation of step 304 in FIG. 3. After detecting an event in a communication session in step 302, the process determines in step 500 if there are any applications registered to monitor the communication session. If there are not any applications registered to monitoring the communication session in step 500, the process goes to step 508 and registers the application to monitor the communication session according to the instruction.

Otherwise, if there are one or more applications registered to monitor the communication session in step 500, the process determine in step 502 if the event is the same event that was registered by another registered application. For example, application 1 and application 2 may define receipt of a SIP INVITE from a specific Universal Resource Identifier (URI). If the event is the same event as another application, the process defines 510 a sequence order based on the application type and/or order instructions. Once the sequence order is defined in step 510, the process goes to step 508.

A requested sequence order can be defined in the instructions. For example, an emergency application (e.g., a 911 application) can indicate that the emergency application will always be first in the sequence (i.e., will be the first to receive the packets). As new applications are registered, the sequence order may change. For example, if a first application was registered before the emergency application, the order of the first application would be changed from first to second.

The order may be defined based on a defined set of rules or based on the type of application. For example, a call processing application (type 1) may be given a different sequence priority over a call recording application (type 2).

If the event is not the same as another application in step 502, the process determines in step 504 if a requested sequence order is defined in the instructions. If a requested sequence order is not defined in step 504, the process determines 512 an order based on defined rules. The process then goes to step 508. Otherwise, if a requested sequence order is defined in the instructions, the process changes the order or inserts the application 506 per the instructions. The process then goes to step 508. In step 508, the process registers the sequence application to monitor the communication session according to the instruction. The process goes to step 306.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
  receiving, by a processor, a request to register a first application to monitor one of media or control signaling transmitted during a first communication session;
  receiving, by the processor, from the first application, a first instruction that identifies a first event in the first communication session and a first event in a second communication session, wherein the first communication session and the second communication session are separate communication sessions;
  detecting, by the processor, the first event in the first communication session and the first event in the second communication session; and
  in response to detecting the first event in the first communication session and the first event in the second communication session, performing the following:
    registering, by the processor, the first application to monitor the first communication session according to the first instruction; and
    sending, by the processor, a notification to the first application to monitor the first communication session according to the first instruction.

2. The method of claim 1, wherein the first instruction further defines a sequence order for the first application.

3. The method of claim 1, wherein the first event is a specific message in the first communication session.

4. The method of claim 1, wherein the first instruction comprises a plurality of instructions that define a sequence of events that initiates the registration of the first application to at least monitor the first communication session.

5. The method of claim 1, wherein the first instruction defines a phase of the first communication session that the first application will monitor.

6. The method of claim 1, further comprising:
  receiving, by the processor, a request to register a second application to monitor the first communication session;
  in response to receiving the request to register the second application, receiving, by the processor, from the second application, a second instruction that identifies a second event in the first communication session;
  detecting, by the processor, the second event in the first communication session; and
  in response to detecting the second event in the first communication session, registering, by the processor, the second application to monitor the first communication session according to the second instruction.

7. The method of claim 6, wherein the first and second instructions indicate a requested sequence order for the first and second applications and in response to receiving the second instruction, changing, by the processor, the sequence order of the first application.

8. The method of claim 6, wherein the first and second events are the same event and further comprising determining, by the processor, a sequence order based a type of the first application or a type of the second application.

9. The method of claim 1, wherein the process of claim 1 is implemented in a JSR-289 container.

10. A system comprising:
  a microprocessor; and
  a computer readable medium, coupled with the microprocessor and comprising microprocessor readable and executable instructions that cause the microprocessor to execute:
    a registration module that receives a request to register a first application to monitor one of media or control signaling transmitted during a first communication session, receives, from the first application, a first instruction that identifies a first event in the first communication session and a first event in a second communication session, wherein the first communication session and the second communication session are separate communication sessions, and registers the first application to monitor the first communication session according to the first instruction in response to detecting the first event in the first communication session and the first event in the second communication session;
    an event detection module that detects the first event in the first communication session and the first event in the second communication session; and
    a notification module that sends a notification to the first application to monitor the first communication session according to the first instruction in response to detecting the first event in the first communication session and the first event in the second communication session.

11. The system of claim 10, wherein the first instruction further defines a sequence order for the first application.

12. The system of claim 10, wherein the first event is a specific message in the first communication session.

13. The system of claim 10, wherein the first instruction comprises a plurality of instructions that define a sequence of events that initiates the registration of the first application to monitor the first communication session.

14. The system of claim 10, wherein the first instruction defines a phase of the first communication session that the first application will monitor.

15. The system of claim 10, wherein:
the registration module receives a request to register a second application to monitor the first communication session, receives, from the second application, a second instruction that identifies a second event in the first communication session in response to receiving the request to register the second application, and registers the second application to monitor the first communication session according to the second instruction in response to detecting the second event in the first communication session; and
the event detection module detects the second event in the first communication session.

16. The system of claim 15, wherein the first and second instructions indicate a requested sequence order for the first and second applications and in response to receiving the second instruction, changing the sequence order of the first application.

17. The system of claim 15, wherein the first and second events are the same event and further comprising determining a sequence order based a type of the first application or a type of the second application.

18. A computer readable medium that is not a signal having stored thereon instructions that cause a processor to execute a method, the method comprising:
instructions to receive a request to register a first application to monitor one of media or control signaling transmitted during a first communication session;
instructions to receive, from the first application, a first instruction that identifies a first event in the first communication session and a first event in a second communication session, wherein the first communication session and the second communication session are separate communication sessions;
instructions to detect the first event in the first communication session and the first event in the second communication session; and
in response to detecting the first event in the first communication session and the first event in the second communication session:
instructions to register the first application to monitor the first communication session according to the first instruction; and
instructions to send a notification to the first application to monitor the first communication session according to the first instruction.

19. The method of claim 1, wherein the one of the media or control signaling transmitted during the first communication session is the media.

20. The system of claim 10, wherein the one of the media or control signaling transmitted during the first communication session is the media.

\* \* \* \* \*